(12) United States Patent
Chen

(10) Patent No.: US 7,144,316 B1
(45) Date of Patent: Dec. 5, 2006

(54) AUGER DEVICE FOR AN AUGER DEVICE FOR A NOZZLE OF A SAUSAGE-MAKING MACHINE

(76) Inventor: Ling-Yun Chen, No. 18, Lane 105, Beifong Rd., Wufong Hsiang, Taichung Hsien (TW)

( * ) Notice: Subject to any disclaimer, the term of this patent is extended or adjusted under 35 U.S.C. 154(b) by 0 days.

(21) Appl. No.: 11/282,570

(22) Filed: Nov. 21, 2005

(51) Int. Cl.
*A22C 11/08* (2006.01)

(52) U.S. Cl. ...................................................... 452/44

(58) Field of Classification Search ................ None
See application file for complete search history.

(56) References Cited

U.S. PATENT DOCUMENTS

| | | | | |
|---|---|---|---|---|
| 2,279,640 A | * | 4/1942 | Ringmarck | ................ 222/252 |
| 3,411,213 A | * | 11/1968 | Spinello | .................... 433/89 |
| 3,642,489 A | * | 2/1972 | Bartley et al. | ................ 426/69 |
| 4,185,123 A | * | 1/1980 | Wenger et al. | .............. 426/272 |
| 5,054,658 A | * | 10/1991 | Aronie | ....................... 222/232 |
| 5,283,074 A | * | 2/1994 | Campbell | ................... 426/496 |
| 6,737,095 B1 | * | 5/2004 | Crider et al. | ............... 426/480 |

\* cited by examiner

*Primary Examiner*—Thomas Price
(74) *Attorney, Agent, or Firm*—Bacon & Thomas PLLC

(57) ABSTRACT

An auger device for a nozzle of a sausage-making machine has a body with a top, a proximal end and a distal end, an inlet, an outlet, an elongated auger, a mounting ring and a casing holder. The inlet is formed on the top of the body. The outlet is formed on the distal end of the body. The elongated auger extends out of the outlet. The mounting ring is mounted on the outlet. The casing holder is mounted on the outlet at the mounting ring. When sausage links are made, ground meat is pushed by the elongated auger, which prevents meat blockage inside the casing holder. Thus, the nozzle for a sausage-making machine will eliminate machine stoppage due to meat blockage.

4 Claims, 5 Drawing Sheets

AUGER DEVICE FOR AN AUGER DEVICE FOR A NOZZLE OF A SAUSAGE-MAKING MACHINE

BACKGROUND OF THE INVENTION

1. Field of the Invention

The present invention relates to a sausage-making machine, more particularly to an auger device for an auger device for a nozzle of a sausage-making machine.

2. Description of the Related Art

There are various types of sausage-making machines available that can form and handle sausage links. A conventional sausage-making machines extrude ground sausage meat through nozzles into sausage casings to produce sausages.

With reference to FIG. 5, a conventional auger device for a nozzle of a sausage-making machine has a hollow body (50) with a proximal end, a distal end, a top, an inlet (51), an auger (52), an outlet (53), a mounting ring (54) and a casing holder (60). The inlet (51) is formed on the top of the body (50) to result in an inverted substantially T-shaped form. The auger (52) has a proximal end and a distal end. The auger (52) is mounted axially and rotatably inside the body (50). The proximal end of the auger (52) protrudes through the proximal end of the body (50). The body (50) is mounted on a sausage-making machine at the proximal end of the auger (52). A motor mounted inside the sausage-making machine drives the auger (52). The outlet (53) is formed on the distal end of the body (50). The mounting ring (54) is mounted on the outlet (53). The casing holder (60) is mounted on the outlet (53) at the mounting ring (54) and has a distal end. The distal end of the casing holder (60) is used for holding a sausage casing. Ground sausage meat is put into the inlet (51) at the top of the nozzle to make sausage links. The sausage links are formed at the casing holder (60).

However, due to the design of the nozzle, meat blockages can occur in the case holder. Many conventional sausage-making machines have proven unreliable and require frequent machine stoppages because of meat blockage in the case holder.

Further disadvantages of conventional sausage-making machines are that they are very slow and require inspection of each sausage link produced to make sure that they are well formed. Furthermore, an extruding stick is needed for pressing sausage meat when a sausage is formed.

To overcome the shortcomings, the present invention provides an auger device for an auger device for a nozzle of a sausage-making machine to obviate or mitigate the aforementioned problems.

SUMMARY OF THE INVENTION

The primary objective of the present invention is to provide an auger device for an auger device for a nozzle of a sausage-making machine that can produce sausage links quickly and eliminate the need for machine stoppage due to meat blockage when forming sausage links.

To achieve the objective, an auger device for a nozzle of a sausage-making machine in accordance with the present invention has a body with a top, a proximal end and a distal end, an inlet, an outlet, an elongated auger, a mounting ring and a casing holder. The inlet is formed on the top of the body. The outlet is formed on the distal end of the body. The elongated auger is axially and rotatably mounted in the body and extends out of the outlet. The mounting ring is mounted on the outlet. The casing holder is mounted on the outlet by the mounting ring. The elongated auger extends into the casing holder. When sausage links are made, sausage meat is pushed by the elongated auger, which prevents sausage meat blockage inside the casing holder. Thus, the nozzle for a sausage-making machine can keep case holders clear of blockages and eliminate the need for machine stoppages.

Other objectives, advantages and novel features of the invention will become more apparent from the following detailed description when taken in conjunction with the accompanying drawings.

DETAILED DESCRIPTION OF THE INVENTION

The present invention relates to an auger device for a nozzle of a sausage-making machine. The nozzle is mounted on a sausage-making machine to improve the rate of filling sausage links and prevent the need for machine stoppage due to meat blockage when filling sausage links.

In the present invention, an auger device for a nozzle of a sausage-making machine has all elements identical to those of a conventional nozzle for a sausage-making machine, but differs in having an elongated auger extending out the of the outlet of the nozzle.

Figure 1:
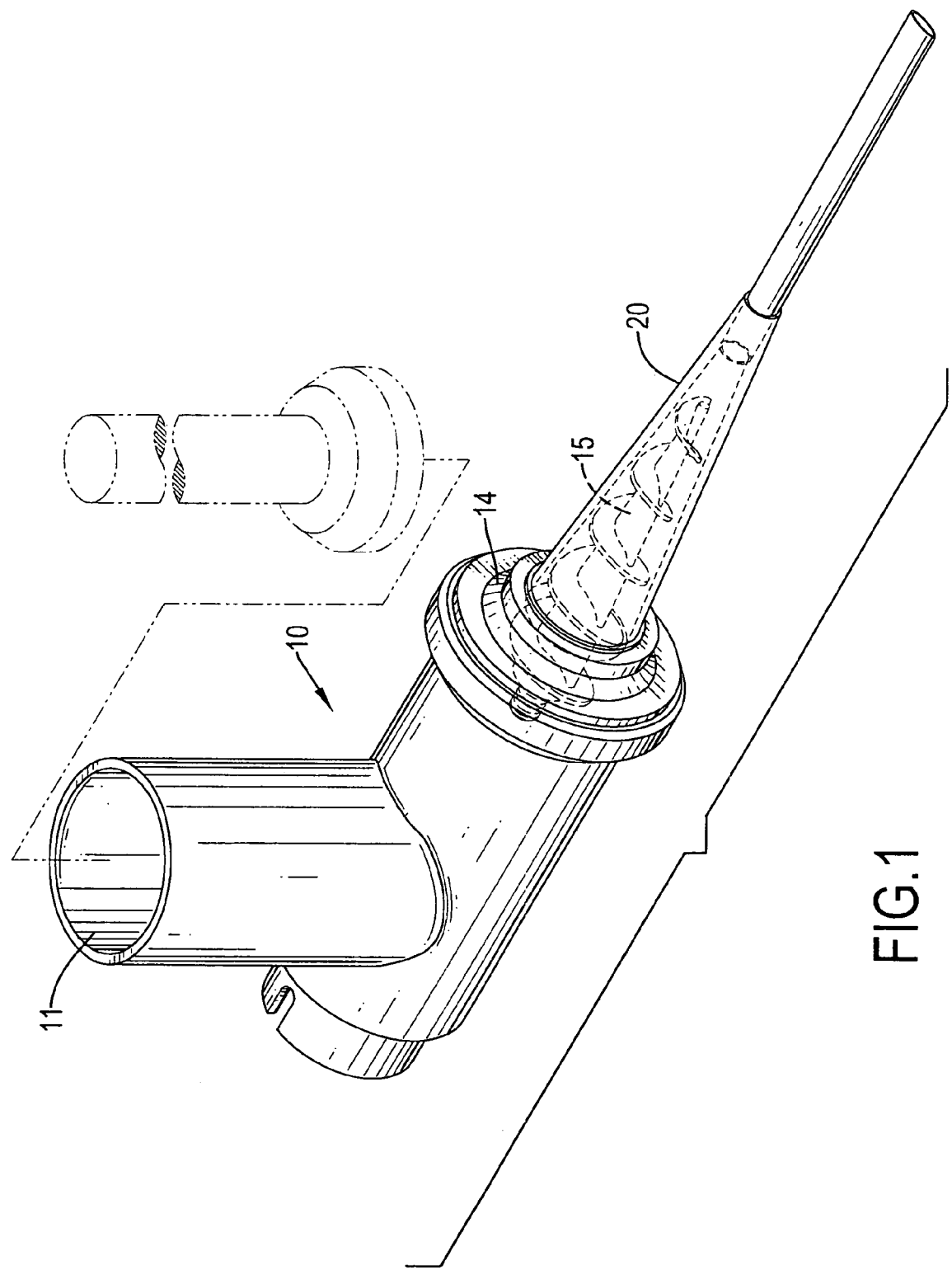
FIG. 1 is a perspective view of a first embodiment of an auger device for a nozzle of a sausage-making machine in accordance with the present invention.
Figure 2:
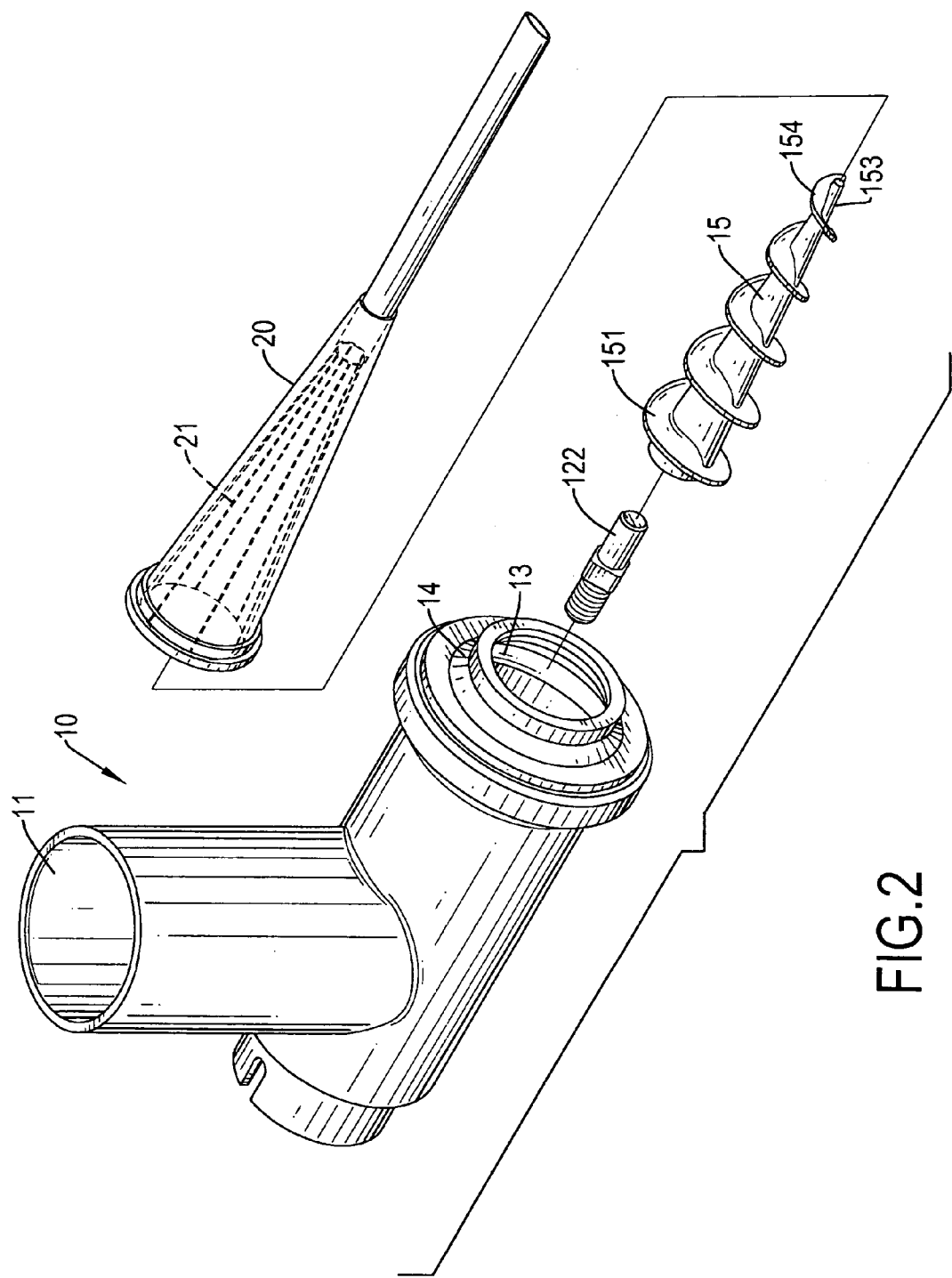
FIG. 2 is an exploded perspective view of the auger device for a nozzle of a sausage-making machine in FIG. 1.
Figure 3:
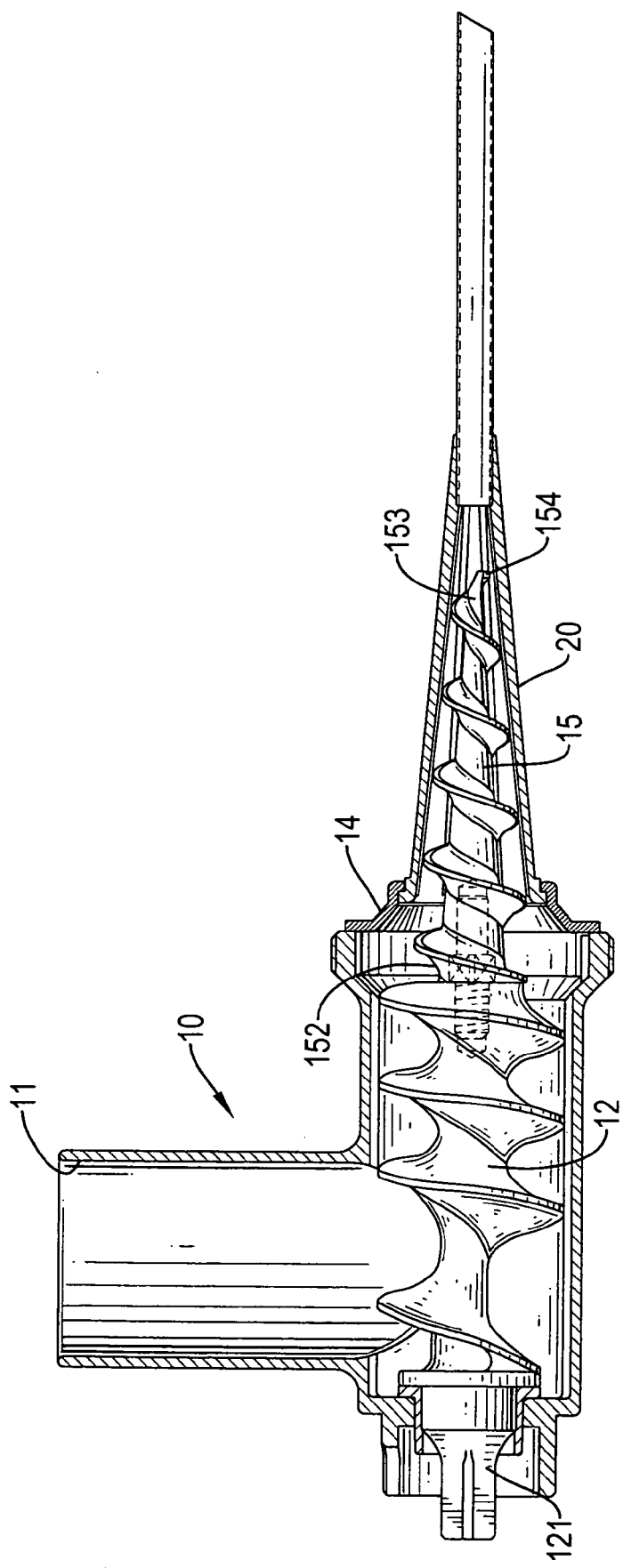
FIG. 3 is a side view in partial section of the auger device for a nozzle of a sausage-making machine in FIG. 1.

With reference to FIGS. 1 and 3, a first embodiment of the auger device for a nozzle of a sausage-making machine in accordance with the present invention is formed much like a conventional nozzle. However, the auger is an elongated auger that has a first auger (12) and a second auger (15). The second auger (15) is axially mounted on the first auger (12).

The nozzle has a hollow body (10) with a top, a proximal end and a distal end, an inlet (11), a first auger (12), an outlet (13), a mounting ring (14), a second auger (15) and a casing holder (20).

The inlet (11) is formed on the top of the body (10). The outlet (13) is formed on the distal end of the body (10). The elongated auger has a first auger (12) and a second auger (15). The elongated auger is axially and rotatably mounted in the body (10) and extends out of the outlet (13). The mounting ring (14) is mounted on the outlet (13). The casing holder (20) is mounted on the outlet (13) by the mounting ring (14). The elongated auger extends into the casing holder (20).

The functions of the inlet (11), the first auger (12), the outlet (13) and the casing holder (20) are the same as described in the prior art, however, the first auger (12) has a distal end, a proximal end (121) and a post (122). The proximal end (121) of the auger (12) is mounted on the sausage-making machine. The post (122) of the first auger (12) is defined in the distal end of the first auger (12). In a preferred embodiment, an end of the post (122) is threaded and is screwed into the distal end of the first auger (12). The second auger (15) is mounted on the first auger (12) and received inside the casing holder (20). The second auger (15) has a proximal end (151), a recess (152), a distal end (153) and a stir (154). The recess (152) is defined in the proximal end of the second auger (15) to receive the post (122) mounted in the first auger (12). The distal end (153) of the second auger (15) is extends out of the outlet (13) in the nozzle (10) and toward the distal end of the casing holder (20). The stir (154) is formed on the distal end (153) of the second auger (15) and said stir includes an axis which extends away from the axis of the second auger (15). The second auger (15) has a predetermined diameter, but is adaptable to other casing sizes when changing to a casing holder (20) with a different diameter.

The casing holder (20) has an inner surface and multiple ribs (21). The ribs (21) are longitudinal formed on the inner surface.

Figure 4:
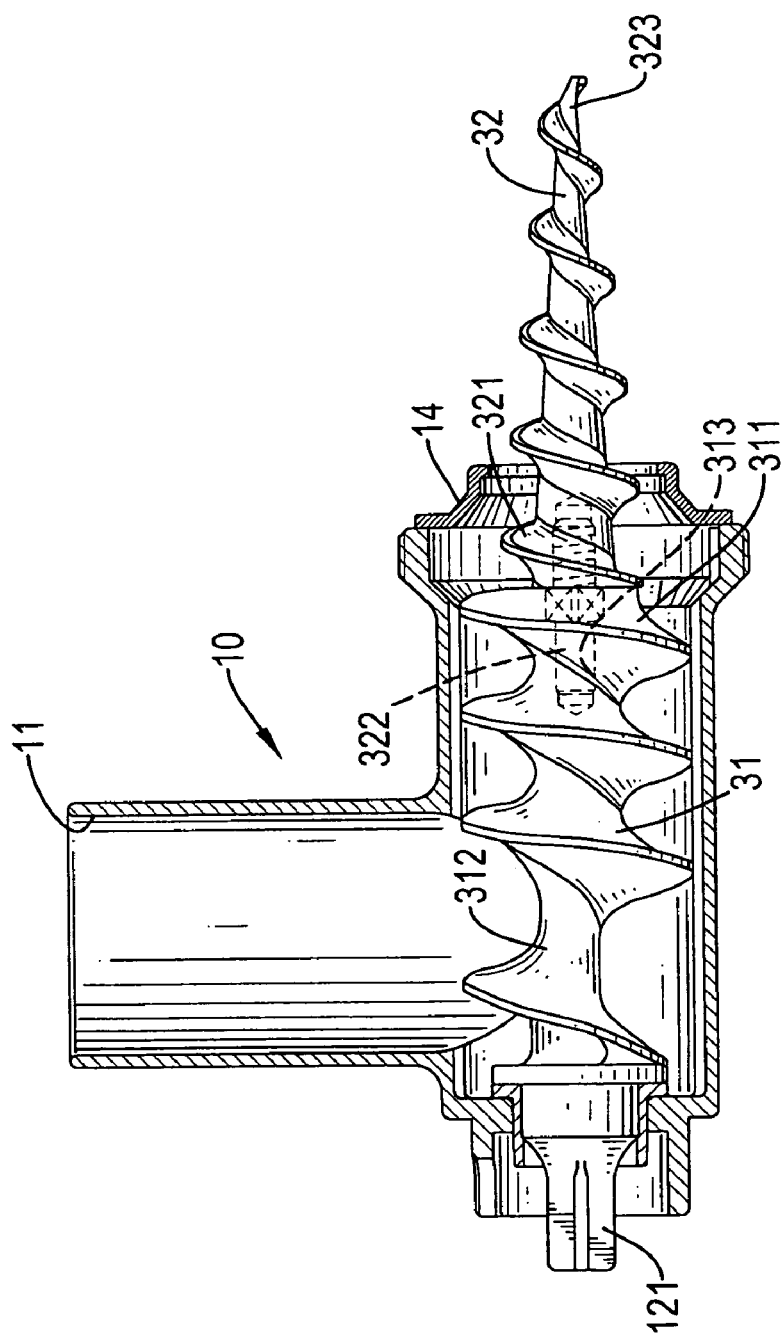
FIG. 4 is a side view in partial section of a second embodiment of an auger device for a nozzle of a sausage-making machine in accordance with the present invention without a casing holder.
Figure 5:
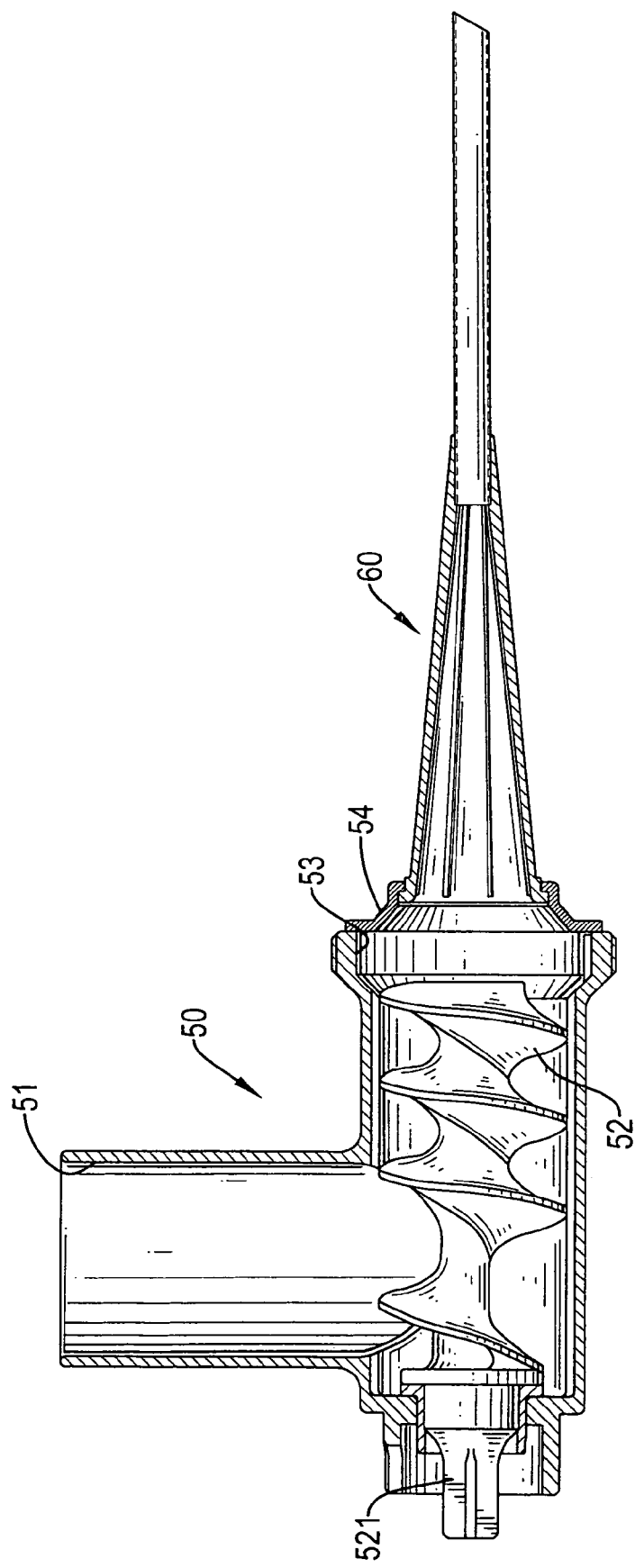
FIG. 5 is a side view in partial section of a conventional nozzle for a sausage-making machine according to the prior art.

With reference to FIG. 4, a second embodiment of the auger device for a nozzle of a sausage-making machine is almost the same as the first embodiment as described above, but differs in the connection between the first auger (31) and the second auger (32). The first auger (31) has a distal end (311), a proximal end (312) and a recess (313). The proximal end (312) of the first auger (31) is mounted on the sausage-making machine and driven by a motor mounted inside the sausage-making machine. The recess (313) is defined in the distal end of the first auger (31). The second auger (32) is mounted on the first auger (31). The second auger (32) has a proximal end (321), a post (322) and a distal end (323). An end of the post (322) is threaded and is screwed into the proximal end of the second auger (32). The opposite end of the post (322) is received inside the recess (313) defined in the first auger (31).

When the auger device for a nozzle of a sausage-making machine is used, the sausage meat is pushed both by the first auger (12, 31) and the second auger (15, 32), so the sausage meat can move smoothly inside the casing holder (20). Also, the sausage meat goes forward and pushes by the ribs (21) formed on the inner surface of the casing holder (20) without an extruding stick. This prevents the stoppages due to blockage of the sausage meat. Further, the augers (12 and 15, 31 and 32) rotate in one direction and the sausage meat moves in an opposite direction, so the opposing force on the augers (12 and 15, 31 and 32) prevents the second auger (15, 32) from falling off of the first auger (12, 31).

The advantages of the auger device for a nozzle of a sausage-making machine are as follows. A sausage-making machine just needs an elongated auger to push the sausage meat through the casing holder and keep it moving to prevent blockage of the sausage meat from occurring. The elongated auger of the present invention does this. The elements required for the elongated auger are few and are simple, so the cost is low.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An auger device for a nozzle of a sausage-making machine having
   a hollow body having
      a proximal end,
      a distal end, and
      a top;
   an inlet formed on the top of the body;
   an outlet formed on the distal end of the body;
   an elongated auger mounted axially and rotatably in the body and extending out of the outlet, the elongated auger having a free distal end, an axis and a stir formed on the distal end of the elongated augers, said stir having an axis which extends away from the axis of the elongated auger;
   a mounting ring mounted on the outlet; and
   a casing holder mounted on the outlet by the mounting ring and having
      an inner surface, and
      multiple ribs formed on the inner surface.

2. The auger device for a nozzle of a sausage-making machine as claimed in claim 1, wherein the elongated auger has a first auger and a second auger, and the second auger is axially mounted on the first auger.

3. The auger device for a nozzle of a sausage-making machine as claimed in claim 2, wherein the first auger has
   a distal end,
   a proximal end adapted for mounting on the sausage-making machine, and
   a recess defined in the distal end of the first auger, and the second auger has
   a proximal end,
   a post with a threaded end screwed into the proximal end of the second auger and received inside the recess defined in the first auger.

4. The auger device for a nozzle of a sausage-making machine as claimed in claim 1, wherein the elongated auger comprises a first auger having
   a distal end,
   a proximal end adapted for mounting on the sausage-making machine, and
   a post with a threaded end screwed into the distal end of the first auger, and
   a second auger having
   an axis,
   a proximal end,
   a recess defined in the distal end of the second auger to receive the post mounted on the first auger, and
   a stir said stir being formed on the distal end of the second auger and away from the axis of the second auger.

* * * * *